United States Patent
Watanabe

(10) Patent No.: US 6,652,393 B1
(45) Date of Patent: Nov. 25, 2003

(54) SOLID GOLF BALL

(75) Inventor: Hideo Watanabe, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 10/219,825

(22) Filed: Aug. 16, 2002

(51) Int. Cl.$^7$ ............................................. A63B 37/06
(52) U.S. Cl. ....................................................... 473/377
(58) Field of Search ................... 473/351, 377, 473/367, 368

(56) References Cited

U.S. PATENT DOCUMENTS

| | | | | |
|---|---|---|---|---|
| 4,424,307 A | * | 1/1984 | DiEdwardo et al. | ........ 525/154 |
| 6,290,613 B1 | * | 9/2001 | Irii et al. | ...................... 473/377 |
| 6,386,993 B1 | * | 5/2002 | Yokota | ........................ 473/373 |

FOREIGN PATENT DOCUMENTS

| | | | | |
|---|---|---|---|---|
| EP | 1068883 | * | 1/2001 | ........... A63B/37/00 |
| JP | 06-319830 | | 11/1994 | |
| JP | 09-215778 A | | 8/1997 | |
| JP | 2001-70478 A | | 3/2001 | |

* cited by examiner

Primary Examiner—Mark S. Graham
Assistant Examiner—Raeann Gorden
(74) Attorney, Agent, or Firm—Sughrue Mion, PLLC

(57) ABSTRACT

A solid golf ball comprising a core and a cover layer is characterized in that the cover layer is formed by carrying out a crosslinking reaction on a rubber composition comprising 100 parts by weight of a base rubber which is composed mainly of a mixture of (A) a polybutadiene of at least 40% cis-1,4 structure with (B) a syndiotactic 1,2-polybutadiene, (C) at least 5 parts by weight of methacrylic acid, (D) at least 5 parts by weight of a metal oxide, and (E) at least 0.1 part by weight of a polymerization initiator.

19 Claims, 1 Drawing Sheet

SOLID GOLF BALL

BACKGROUND OF THE INVENTION

The present invention relates to golf balls having a core and a cover layer, and more particularly to golf balls endowed with exceptional scuff resistance, a large rebound and a suitable spin rate on approach shots.

Ionomer resins and the trans-polyisoprene rubber known by the name of balata rubber have been used to date as the cover material in golf balls. Golf balls made with balata rubber in particular are preferred by golfers who value controllability and the feel of the ball when hit with a club.

However, because a balata cover is inferior to an ionomer cover in terms of resilience, distance traveled by the ball and scuff resistance on shots taken with an iron, there is much room for improvement. A need thus exists for new golf balls endowed not only with a large rebound and distance, but also improved scuff resistance, controllability and feel upon impact.

JP-A 6-319830 discloses a two-piece solid golf ball in which the cover layer is made of a relatively soft ionomer resin. Yet, there is still room for improvement in the scuff resistance of the ball.

JP-A 9-215778 describes a two-piece solid golf ball having a urethane cover. Here too, the scuff resistance leaves something to be desired.

JP-A 2001-70478 discloses technology for obtaining golf balls in which the cover layer is formed of a rubber composition containing a polybutadiene having a cis-1,4 structure as the base rubber, and containing also specific amounts of $\alpha,\beta$-unsaturated carboxylic acid, metal oxide and polymerization initiator. Such a cover layer provides the ball with an excellent controllability and a good feel comparable to that of a ball having a cover made of balata rubber, and also gives it a large rebound and good flight performance and scuff resistance. However, such golf balls are sometimes overly receptive to spin, and thus leave something to be desired with regard to their controllability in a head wind, particularly when used by a professional golfer or a skilled amateur.

SUMMARY OF THE INVENTION

It is therefore an object of the invention to provide a golf ball which has the degree of spin desired by professional golfers, skilled amateurs, and other players who aspire to a high level of proficiency, and which also has a good rebound and excellent scuff resistance.

We have discovered that, in solid golf balls having a cover layer made of a rubber composition containing polybutadiene with at least a 40 wt % cis-1,4 structure, methacrylic acid, metal oxide and a polymerization initiator, by additionally compounding a polybutadiene of a specific structure in the rubber composition, the hardness of the cover layer can be improved while retaining such qualities as the good scuff resistance inherent to the crosslinked form of the rubber composition. We have thus found that golf balls with a cover layer made of a rubber composition which includes such a polybutadiene of a specific structure have the degree of spin desired by professional golfers, skilled amateurs, and other players who aspire to a high level of proficiency, and also have an excellent scuff resistance and a good rebound.

Accordingly, the invention provides the following golf balls.

(1) A solid golf ball having a core and a cover layer, characterized in that the cover layer is formed by carrying out a crosslinking reaction on a rubber composition comprising 100 parts by weight of a base rubber which is composed mainly of a mixture of (A) a polybutadiene of at least 40% cis-1,4 structure with (B) a syndiotactic 1,2-polybutadiene, (C) at least 5 parts by weight of methacrylic acid, (D) at least 5 parts by weight of a metal oxide, and (E) at least 0.1 part by weight of a polymerization initiator.

(2) The solid golf ball of (1) above, characterized in that 100 parts by weight of the base rubber is composed of 50 to 95 parts by weight of component A, 5 to 40 parts by weight of component B, and (F) 0 to 20 parts by weight of a polyisoprene rubber of at least 40 wt % cis-1,4 structure; and the rubber composition includes 5 to 40 parts by weight of component C, 5 to 40 parts by weight of component D, and 0.1 to 5 parts by weight of component E per 100 parts by weight of the base rubber.

(3) The solid golf ball of (1) or (2) above, characterized in that the ball surface and the core have a difference in Shore D hardness therebetween such that $-3 \leq [(\text{ball surface hardness})-(\text{average core hardness})]$.

(4) The solid golf ball of any one of (1) to (3) above which is a two-piece solid golf ball.

(5) The solid golf ball of any one of (1) to (4) above, characterized in that the cover layer has an overall thickness of at most 2.0 mm.

(6) The solid golf ball of any one of (1) to (5) above, characterized in that the ball has a USGA standard test-based initial velocity of 76.5 to 77.7 m/s.

DETAILED DESCRIPTION OF THE INVENTION

Figure 1:
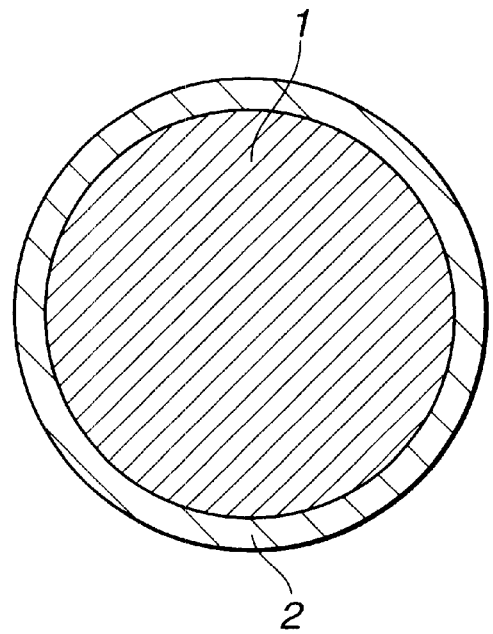
FIG. 1 is a sectional view showing a solid golf ball according to one embodiment of the invention.

The invention is described more fully below.

The golf ball of the invention is a golf ball having a core and a cover layer, in which the cover layer is formed by carrying out a crosslinking reaction on a rubber composition comprising as the essential components: (A) a polybutadiene of at least 40 wt % cis-1,4 structure, (B) a syndiotactic 1,2-polybutadiene, (C) methacrylic acid, (D) a metal oxide, and (E) a polymerization initiator.

The polybutadiene of at least 40 wt % cis-1,4 structure used as component A may be a commercial product, illustrative examples of which include those produced by JSR Corporation under the trade names BR01, BR02LL, BR11, BR18 and BR31. The cis-1,4 structure content is preferably at least 80 wt %, and most preferably at least 94 wt %.

The syndiotactic 1,2-polybutadiene serving as component B is preferably a polybutadiene having a syndiotactic 1,2 bond content of at least 80 wt %.

Examples of commercial products that may be used as component B include those produced by JSR Corporation under the trade names RB810, RB820 and RB830.

The base rubber in the invention is a rubber composed primarily of a mixture of above components A and B.

The base rubber generally has a component A content of at least 50 wt %, and preferably at least 60 wt %, but not more than 95 wt %, and preferably not more than 80 wt %.

Too little component A may significantly lower the rebound and scuff resistance of the ball, whereas too much component A may make it impossible to achieve a suitable hardness and may make the ball overly receptive to spin.

The base rubber generally has a component B content of at least 5 wt %, and preferably at least 8 wt %, but not more than 40 wt %, and preferably not more than 30 wt %. Too little component B may make the ball overly receptive to spin when hit, whereas too much may significantly lower the rebound.

In addition to above components A and B, the base rubber in the invention may optionally include also other rubber components, such as polyisoprene rubber and trans-polyisoprene rubber. Of these, (F) a polyisoprene rubber of at least 40 wt % cis-1,4 structure is preferably included for good workability during kneading of the cover stock.

The base rubber generally has a component F content of not more than 20 wt %, preferably not more than 10 wt %, and most preferably not more than 5 wt %. Too much component F may significantly lower the rebound of the ball.

Component F may be a commercial product, examples of which include those produced by JSR Corporation under the trade names IR2200 and IR2200J.

The methacrylic acid used as component C in the invention is generally included in an amount, per 100 parts by weight of the base rubber, of at least 5 parts by weight, and preferably at least 10 parts by weight, but not more than 40 parts by weight, and preferably not more than 30 parts by weight. Too little component C may result in an excessively low golf ball hardness and rebound, whereas too much may significantly lower the scuff resistance of the ball.

Component C may be a commercial product, one suitable example of which is that produced by Nippon Shokubai Co., Ltd. under the trade name MQ-250.

Component D in the invention is a metal oxide, suitable examples of which include zinc oxide, magnesium oxide and calcium oxide. The use of zinc oxide is preferred from the standpoint of durability.

The metal oxide used as component D is generally included in an amount, per 100 parts by weight of the base rubber, of at least 5 parts by weight, and preferably at least 10 parts by weight, but not more than 40 parts by weight, and preferably not more than 30 parts by weight. Too little metal oxide may fail to provide the ball with sufficient hardness and scuff resistance, whereas too much may lower the rebound.

The metal oxide used in the invention may be a commercial product, one suitable example of which is the zinc oxide produced by Sakai Chemical Industry Co., Ltd. under the trade name Type 3 Zinc Oxide.

The polymerization initiator used in the invention as component E may be a known polymerization initiator. Preferred polymerization initiators include organic peroxides and inorganic peroxides. Specific examples include dicumyl peroxide, t-butyl peroxybenzoate, t-butylcumyl peroxide and 1,1-bis(t-butylperoxy)-3,3,5-trimethylcyclohexane. Of these, the use of dicumyl peroxide and 1,1-bis(t-butylperoxy)-3,3,5-trimethylcylohexane is preferred.

Component E is generally included in an amount, per 100 parts by weight of the base rubber, of at least 0.1 part by weight, preferably at least 0.5 part by weight, and most preferably at least 0.8 part by weight, but not more than 5 parts by weight, preferably not more than 2 parts by weight, and most preferably not more than 1.4 parts by weight. If the amount of component E is outside the above range, the cover may have insufficient strength and exhibit a dramatic decline in scuff resistance, in addition to which a golf ball of optimal hardness may be impossible to achieve.

Component E may be a commercial product, suitable examples of which include those produced by NOF Corporation under the trade names Percumil D and Perhexa 3M-40. Of these, Percumil D is especially preferred.

The cover layer in the golf ball of the present invention is made of a rubber composition containing above components A to E as the essential constituents. If desired, optional additives such as inert fillers, antioxidants, dispersants, resin stabilizers, processing aids and vulcanization chemicals may also be suitably included in the rubber composition, insofar as the objects of the invention are attainable.

Preferred examples of the inert filler include zinc carbonate, barium sulfate, calcium carbonate, silica and titanium dioxide. These may be used alone, or as combinations or two or more thereof.

The inert filler is generally included in the rubber composition in an amount, per 100 parts by weight of the base rubber, of not more than 50 parts by weight, preferably not more than 40 parts by weight, more preferably not more than 30 parts by weight, and most preferably not more than 20 parts by weight. Too much inert filler may keep the golf ball from having an appropriate weight and desirable rebound characteristics.

The antioxidant used in the rubber composition may be a commercial product, preferred examples of which include Nocrac NS-6 and Nocrac NS-30 (both made by Ouchi Shinko Chemical Industry Co., Ltd.), and Yoshinox 425 (made by Yoshitomi Pharmaceutical Industries, Ltd.). Any one or combinations of two or more thereof may be used.

The antioxidant is generally included in an amount, per 100 parts by weight of the base rubber, of at least 0 part by weight, preferably at least 0.05 part by weight, more preferably at least 0.1 part by weight, and most preferably at least 0.2 part by weight, but not more than 3 parts by weight, preferably not more than 2 parts by weight, more preferably not more than 1 part by weight, and most preferably not more than 0.5 part by weight. Too much or too little antioxidant may make it impossible to achieve good rebound characteristics and durability.

The cover layer in the golf ball of the invention generally has an overall thickness of at least 0.3 mm, preferably at least 0.7 mm and most preferably at least 1.0 mm, but not more than 3.0 mm, preferably not more than 2.0 mm, and most preferably not more than 1.9 mm. Too large an overall cover thickness may result in the golf ball having insufficient rebound and a reduced distance, whereas an overall thickness that is too small may cause the golf ball to take on too much spin when hit and may significantly lower its scuff resistance.

The solid golf ball of the invention has a cover layer formed by blending together the various above-described materials and carrying out a crosslinking reaction. In particular, at temperatures of up to 23° C., the ball has an outstanding scuff resistance, the hardness can be appropriately adjusted so as to enable the spin rate to be controlled within a suitable range on approach shots, and the ball has excellent rebound characteristics, enabling a good distance to be achieved.

Any suitable known process may be used without particular limitation to carry out the crosslinking reaction. For example, use may be made of a thermoforming process in which the temperature is raised from room temperature to about 150 to 185° C. over a period of 10 to 30 minutes.

The solid golf ball of the invention has a cover layer made of above-described components A to E. The cover layer is either formed directly over the core or over one or more intervening mantle layer that has been formed over and covers the core.

Figure 2:
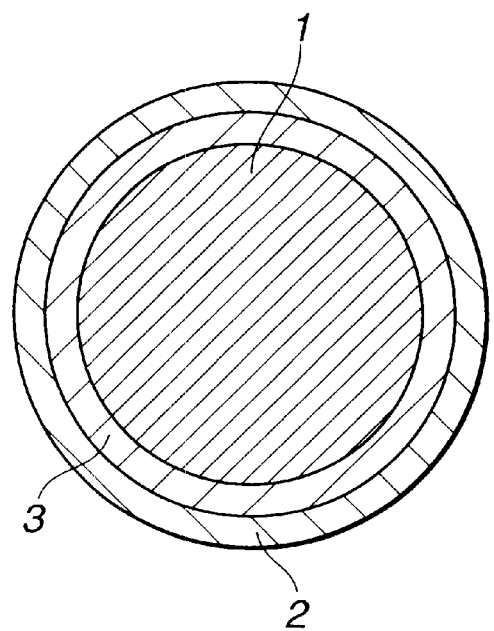
FIG. 2 is a sectional view showing a solid golf ball according to another embodiment of the invention.

The inventive golf ball is described more fully while referring to attached FIGS. 1 and 2. FIG. 1 is a sectional view showing a two-piece solid golf ball composed of a core 1 over which a cover 2 has been formed. FIG. 2 is a sectional view showing a three-piece solid golf ball composed of a core 1 and a cover 2 with a mantle layer 3 formed therebetween. The ball may have more than one mantle layer.

In cases where the solid golf ball of the invention has a mantle layer provided between the cover layer made of the above-described rubber composition containing components A to E and the core, any suitable known material may be used without particular limitation to form the mantle layer. Illustrative examples of such materials include resin materials such as ethylene-based ionomer resins, olefin elastomers, polyester elastomers, polyurethane elastomers, polyamide elastomers and blends thereof, as well as rubber materials.

In the practice of the invention, it is also possible to use the above-described rubber composition to form the mantle layer.

To obtain the golf ball of the invention, first a core is manufactured over which the above-described cover layer will later be formed. Any suitable known method may be used to manufacture the core. The core of the inventive golf ball is preferably formed using a rubber composition containing a co-crosslinking agent, an organic peroxide and an organosulfur compound. The base rubber of the rubber composition is preferably composed primarily of a polybutadiene.

The polybutadiene is not subject to any particular limitation and may be any that has hitherto been used in golf ball cores, although a 1,4-cis polybutadiene having a cis unit content of at least 40 wt % is preferred. The base rubber is preferably one obtained by compounding the polybutadiene with another rubber, such as natural rubber, polyisoprene rubber or styrene-butadiene rubber.

It is recommended that the base rubber have a polybutadiene content of generally at least 50 wt %, preferably at least 76 wt %, and most preferably at least 80 wt %. Too low a base rubber content within the polybutadiene may greatly lower the rebound characteristics, scuff resistance and durability to repeated impact of the golf ball.

The polybutadiene used in the base rubber may be a commercial product, illustrative examples of which include those produced by JSR Corporation under the trade names BR01, BR02LL, BR11, BR18 and BR31.

Illustrative examples of the co-crosslinking agent include unsaturated carboxylic acids and the metal salts of unsaturated carboxylic acids.

Specific examples of unsaturated carboxylic acids include acrylic acid, methacrylic acid, maleic acid and fumaric acid. Acrylic acid is especially preferred.

The metal salts of unsaturated carboxylic acids are not subject to any particular limitation, and may be, for example, any of the above unsaturated carboxylic acids that has been neutralized with a desired metal ion. Specific examples include the zinc, magnesium and calcium salts of methacrylic acid and acrylic acid. Of these, the use of zinc acrylate is especially preferred.

The co-crosslinking agent is generally included in an amount, per 100 parts by weight of the base rubber, of at least 10 parts by weight, preferably at least 15 parts by weight, and most preferably at least 20 parts by weight, but not more than 60 parts by weight, preferably not more than 50 parts by weight, more preferably not more than 45 parts by weight, and most preferably not more than 40 parts by weight. Too much co-crosslinking agent may result in excessive hardness, making the feel of the ball when hit with a golf club very unpleasant. On the other hand, too little may lower the rebound characteristics of the ball.

The organic peroxide may be a commercial product, suitable examples of which include Percumil D (manufactured by NOF Corporation), Perhexa 3M (manufactured by NOF Corporation) and Luperco 231XL (manufactured by Atochem Co.). Any one or combinations of two or more thereof may be used.

The organic peroxide is generally included in an amount, per 100 parts by weight of the base rubber, of at least 0.1 part by weight, preferably at least 0.3 part by weight, more preferably at least 0.5 part by weight, and most preferably at least 0.7 part by weight, but not more than 5 parts by weight, preferably not more than 4 parts by weight, more preferably not more than 3 parts by weight, and most preferably not more than 2 parts by weight. Too much or too little organic peroxide may make it impossible to achieve a ball having a good feel upon impact and good durability and rebound characteristics.

Optional additives such as metal oxides, inert fillers, antioxidants, dispersants, resin stabilizers, processing aids and vulcanization chemicals may also be suitably included in the rubber composition used to form the core, insofar as the objects of the invention are attainable.

Suitable examples of the metal oxide include the same as those mentioned above for the cover layer-forming material. The metal oxide is preferably used in an amount of not more than 40 parts by weight, and especially not more than 30 parts by weight, per 100 parts by weight of the base rubber. Too much metal oxide may unduly harden the ball and lower its durability.

Preferred examples of the inert filler include zinc carbonate, barium sulfate, calcium carbonate, silica and titanium dioxide. These may be used alone, or as combinations or two or more thereof.

The inert filler is generally included in an amount, per 100 parts by weight of the base rubber, of not more than 50 parts by weight, preferably not more than 40 parts by weight, more preferably not more than 30 parts by weight, and most preferably not more than 20 parts by weight. Too much inert filler may keep the golf ball from having an appropriate weight and good rebound characteristics.

The antioxidant used in the rubber composition may be a commercial product, preferred examples of which include Nocrac NS-6 and Nocrac NS-30 (both made by Ouchi Shinko Chemical Industry Co., Ltd.), and Yoshinox 425 (made by Yoshitomi Pharmaceutical Industries, Ltd.). Any one or combinations of two or more thereof may be used.

The antioxidant is generally included in an amount, per 100 parts by weight of the base rubber, of at least 0 part by weight, preferably at least 0.05 part by weight, more preferably at least 0.1 part by weight, and most preferably at least 0.2 part by weight, but not more than 3 parts by weight, preferably not more than 2 parts by weight, more preferably not more than 1 part by weight, and most preferably not more than 0.5 part by weight. Too much or too little antioxidant may make it impossible to achieve good rebound characteristics and durability.

To enhance the rebound characteristics of the golf ball and increase its initial velocity, it is preferable for the core to include an organosulfur compound.

The organosulfur compound is not subject to any particular limitation, provided it is able to enhance the rebound characteristics of the ball. Exemplary organosulfur compounds include thiophenols, thionaphthols, halogenated thiophenols, and metal salts thereof. Specific examples include pentachlorothiophenol, pentafluorothiophenol, pentabromothiophenol, p-chlorothiophenol, the zinc salt of pentachlorothiophenol, the zinc salt of pentafluorothiophenol, the zinc salt of pentabromothiophenol, the zinc salt of p-chlorothiophenol, and organosulfur compounds having 2 to 4 sulfurs, such as diphenylpolysulfides, dibenzylpolysulfides, dibenzoylpolysulfides, dibenzothiazoylpolysulfides and dithiobenzoylpolysulfides. Diphenyldisulfide and the zinc salt of pentachlorothiophenol are especially preferred.

The organosulfur compound is generally included in an amount, per 100 parts by weight of the base rubber, of at least 0.1 part by weight, preferably at least 0.2 part by weight, and most preferably at least 0.4 part by weight, but generally not more than 2 parts by weight, preferably not more than 1.5 parts by weight, and most preferably not more than 1.2 parts by weight. With too much organosulfur compound, the effects of addition may reach a point at which no further improvement occurs. On the other hand, too little may make it impossible to fully achieve the desired effects.

The core can be produced by subjecting the rubber composition containing the various above constituents to vulcanization and curing by a known method. Typically, the rubber composition is worked with a mixing apparatus such as a Banbury mixer or a roll mill, then compression molded or injection molded in a core mold. The molded core is then cured by suitable heating at a temperature sufficient for the peroxide and the co-crosslinking agent to act. When dicumyl peroxide is used as the peroxide and zinc acrylate is used as the co-crosslinking agent, heating is generally carried out at about 130 to 170° C., and preferably 150 to 160° C., for about 10 to 40 minutes, and preferably 12 to 20 minutes.

Unless noted otherwise, "hardness," as used herein, refers to the Shore D hardness.

"Average core hardness," as used herein, refers to the arithmetic mean of the core surface hardness and the core center hardness. The average core hardness is generally at least 38, preferably at least 40, and most preferably at least 43, but generally not more than 54, preferably not more than 52, and most preferably not more than 50. At too low an average core hardness, the golf ball may have a feel upon impact that is too soft, even "mushy," and may have diminished rebound characteristics, resulting in a poor distance. On the other hand, an average core hardness which is too high may impart the ball with an undesirably hard feel on impact, and may excessively increase the spin when the ball is struck with a number one wood (W#1), giving the ball a high trajectory at the expense of distance, particularly when hit into a headwind.

The golf ball of the invention has a surface hardness of generally at least 47, and preferably at least 48, but not more than 60. Too low a surface hardness may make the ball too receptive to spin, reducing the carry. On the other hand, too high a surface hardness may excessively lower the spin rate, making the ball more difficult to control, in addition to which it may also lower the scuff resistance of the ball.

The ball surface and the core have a difference in Shore D hardness therebetween, expressed as [(ball surface hardness)−(average core hardness)], which is generally −3 or higher ($\geq -3$), preferably −1 or higher, and most preferably 0 or higher, but preferably not higher than 10, and most preferably not higher than 8. Too large a difference between the cover hardness and the average core hardness may result in too little spin on approach shots and a decrease in the scuff resistance. On the other hand, a hardness difference which is too small may result in excessive spin when the ball is hit with a number one wood (W#1), giving the ball a high trajectory at the expense of distance.

The core has a diameter of preferably at least 37 mm, and most preferably at least 38.6 mm, but preferably not more than 41.3 mm, and most preferably not more than 40.7 mm. The core has a weight of preferably 30 to 39 g, and most preferably 33 to 36 g.

Any suitable known molding method may be used to mold the cover layer in the invention. For example, use may be made of a conventional method such as molding under applied pressure or rubber injection molding.

If molding is carried out under applied pressure, the rubber composition used to make the cover layer is formed, in an unvulcanized or semi-vulcanized state, into sheets or half-cups which are then placed around a pre-manufactured molded body ("molded body" refers here and below either to a core, or to a core about which a cover layer molded from another material has been formed). The resulting assembly is loaded into a room-temperature mold, after which it is subjected to applied pressure and heated to about 150 to 185° C. over a period of about 10 to 30 minutes, then held at the highest attained temperature for about 0 to 10 minutes. If a rubber injection molding process is used, the rubber composition prepared is introduced, in an unvulcanized or a semi-vulcanized state, to a rubber injection molding machine, then injection molded into a mold in which a molded body has been placed.

Solid golf balls of the invention that are formed as described above are preferably two-piece solid golf balls.

The surface of the solid golf ball of the invention may have numerous dimples formed thereon. If necessary, it may be subjected to surface preparation and may be painted and have markings applied thereto.

The solid golf ball of the invention can be manufactured in accordance with the Rules of Golf for use in competitive play, in which case the ball may be formed to a diameter of not less than 42.67 mm and a weight of not more than 45.93 g.

It is advantageous for the solid golf ball of the invention to be manufactured so as to have a United States Golf Association (USGA) standard test-based initial velocity of at least 76.5 m/s, preferably at least 76.7 m/s, and most preferably at least 77.0 m/s, but not more than 77.7 m/s. Too low an initial velocity may result in a poor carry, whereas too high an initial velocity may place the golf ball outside the specifications set by the Royal and Ancient Golf Club of St. Andrews (R&A) and the USGA.

"USGA standard test-based initial velocity," as used herein, refers to the value measured using an initial velocity measuring apparatus of the same type as the USGA drum rotation-type initial velocity instrument approved by the R&A. The ball was temperature conditioned at 23±1° C. for at least 3 hours, then tested in a chamber at a room temperature of 23±2° C. The ball was hit using a 250-pound (113.4 kg) head (striking mass) at an impact velocity of 143.8 ft/s (43.83 m/s). One dozen balls were each hit four times. The time taken to traverse a distance of 6.28 ft (1.88 m) was measured and used to compute the initial velocity. This cycle was carried out over a period of about 15 minutes.

EXAMPLES

Examples of the invention and comparative examples are given below by way of illustration and not be way of limitation.

Examples 1 to 3. Comparative Examples 1 to 4

Two-piece solid golf balls were produced using the core formulations and cover formulations shown in Tables 1 and 2. The physical properties of the cores and of the golf balls composed of a core enclosed within a cover are also shown in Tables 1 and 2. Table 3 shows the performance characteristics of the resulting two-piece solid golf balls.

TABLE 1

| | | Example | | | Comparative Example | | | |
|---|---|---|---|---|---|---|---|---|
| | | 1 | 2 | 3 | 1 | 2 | 3 | 4 |
| Core formulation (pbw) | Polybutadiene (1) | 40.0 | 40.0 | 40.0 | 40.0 | 40.0 | 40.0 | 40.0 |
| | Polybutadiene (2) | 60.0 | 60.0 | 60.0 | 60.0 | 60.0 | 60.0 | 60.0 |
| | Zinc acrylate | 32.5 | 34.9 | 33.3 | 35.7 | 34.9 | 31.7 | 32.5 |
| | Peroxide (1) | 0.6 | 0.6 | 0.6 | 0.6 | 0.6 | 0.6 | 0.6 |
| | Peroxide (2) | 0.6 | 0.6 | 0.6 | 0.6 | 0.6 | 0.6 | 0.6 |
| | Antioxidant | 0.2 | 0.2 | 0.2 | 0.2 | 0.2 | 0.2 | 0.2 |
| | Zinc oxide | 13.1 | 11.7 | 12.1 | 11.0 | 11.8 | 18.8 | 12.4 |
| | Organosulfur compound | 1.0 | 1.0 | 1.0 | 1.0 | 1.0 | 1.0 | 1.0 |
| | Zinc stearate | 5.0 | 5.0 | 5.0 | 5.0 | 5.0 | 5.0 | 5.0 |
| Vulcanizing conditions | | 155° C. × 15 minutes | | | | | | |
| Core properties | Outside diameter (mm) | 38.90 | 38.90 | 38.90 | 38.90 | 38.90 | 38.90 | 38.90 |
| | Core surface hardness | 54 | 56 | 54 | 57 | 56 | 53 | 54 |
| | Core center hardness | 40 | 42 | 41 | 42 | 42 | 40 | 40 |
| | Average core hardness | 47 | 49 | 48 | 50 | 49 | 46 | 47 |

Polybutadiene (1): BR11 (trade name), made by JSR Corporation
Polybutadiene (2): BR18 (trade name), made by JSR Corporation
Zinc Acrylate: ZN-DA85S (trade name), made by Nippon Shokubai Co., Ltd.
Peroxide (1): Percumil D (trade name), made by NOF Corporation. Dicumyl peroxide.
Peroxide (2): Perhexa 3M-40 (trade name), made by NOF Corporation. 1,1-Bis(t-butylperoxy)-3,3,5-trimethylcyclohexane.
Antioxidant: Nocrac NS-6 (trade name), made by Ouchi Shinko Chemical Industry Co., Ltd.
Zinc oxide: Sanshu Sanka Aen (trade name), made by Sakai Chemical Industry Co., Ltd.
Organosulfur Compound: Zinc salt of pentachlorothiophenol.
Zinc Stearate: Zinc Stearate G (trade name), made by NOF Corporation.
Core Surface Hardness: The Shore D hardness measured at the surface of the core in accordance with ASTM D-2240.
Core Center Hardness: The core was cut into hemispheres, and the Shore D hardness at the center of the core was measured in accordance with ASTM D-2240.
Average Core Hardness: The arithmetic mean of the core surface hardness and the core center hardness.

TABLE 2

| | Example | | | Comparative Example | | | |
|---|---|---|---|---|---|---|---|
| | 1 | 2 | 3 | 1 | 2 | 3 | 4 |
| Cover formulation (pbw) | | | | | | | |
| Polybutadiene (3) | 73.1 | 79.2 | 86.4 | 95.0 | | | 79.2 |
| Polyisoprene | 3.8 | 4.2 | 4.5 | 5.0 | | | 4.2 |
| Polybutadiene (4) | 23.1 | 16.7 | 9.1 | | | | |
| Styrene rubber | | | | | | | 16.7 |
| Zinc oxide | 17.7 | 19.2 | 20.9 | 23.0 | | | 19.2 |
| Antioxidant | 0.2 | 0.2 | 0.2 | 0.2 | | | 0.2 |
| Methacrylic acid | 17.3 | 18.8 | 20.5 | 22.5 | | | 18.8 |
| Peroxide (3) | 0.80 | 0.90 | 0.90 | 1.02 | | | 0.90 |
| Vulcanizing method | A | A | A | A | | | A |
| Thermoplastic polyurethane (1) | | | | | 50 | | |
| Thermoplastic polyurethane (2) | | | | | 50 | | |
| Diisocyanate | | | | | 1.5 | | |
| Titanium dioxide | | | | | 4 | 4 | |
| Polyethylene wax | | | | | 1.5 | | |
| Ionomer resin (1) | | | | | | 35 | |
| Ionomer resin (2) | | | | | | 35 | |
| AN4311 | | | | | | 30 | |
| Cover layer thickness (mm) | 1.9 | 1.9 | 1.9 | 1.9 | 1.9 | 1.9 | 1.9 |
| Ball properties | | | | | | | |
| Ball surface hardness | 50 | 49 | 48 | 46 | 50 | 53 | 46 |
| Hardness difference | 3 | 0 | 0 | −4 | 1 | 7 | −1 |

TABLE 2-continued

|  | Example | | | Comparative Example | | | |
| --- | --- | --- | --- | --- | --- | --- | --- |
|  | 1 | 2 | 3 | 1 | 2 | 3 | 4 |
| Outside diameter (mm) | 42.70 | 42.70 | 42.70 | 42.70 | 42.70 | 42.70 | 42.70 |
| Weight (g) | 45.30 | 45.30 | 45.30 | 45.30 | 45.30 | 45.30 | 45.30 |

Polybutadiene (3): BR01 (trade name), made by JSR Corporation.
Polyisoprene: IR2200 (trade name), made by JSR Corporation.
Polybutadiene (4): RB280 (trade name), a syndiotactic 1,2-polybutadiene made by JSR Corporation.
Styrene Rubber: JSR0061 (trade name), made by JSR Corporation.
Zinc oxide: Sanshu Sanka Aen (trade name), made by Sakai Chemical Industry Co., Ltd.
Antioxidant: Nocrac NS-6 (trade name), made by Ouchi Shinko Chemical Industry Co., Ltd.
Methacrylic acid: MQ-250 (trade name), made by Nippon Shokubai Co., Ltd.
Peroxide (3): Percumil D (trade name), made by NOF Corporation. Dicumyl peroxide.
Vulcanizing Method: In method A, the core was enclosed within unvulcanized rubber and charged into a room-temperature mold, following which the mold was inserted into a press heated to 165° C. and vulcanization was carried out for 24 hours.
Thermoplastic Polyurethane (1): Pandex T7298 (trade name), made by DIC Bayer Polymer, Ltd.
Thermoplastic Polyurethane (2): Pandex TR3080 (trade name), made by DIC Bayer Polymer, Ltd.
Diisocyanate: Desmodur W (trade name), dicyclohexylmethane-4,4'-diisocyanate made by ACI Japan Ltd. (hydrogenated diphenylmethane-4,4'-diisocyanate).
Ionomer Resin (1): Himilan 1855 (trade name), made by DuPont-Mitsui Polychemicals Co., Ltd.
Ionomer Resin (2): Surlyn 8120 (trade name), made by E.I. DuPont de Nemours & Co.
AN4311: Nucrel (trade name), made by DuPont-Mitsui Polychemicals Co., Ltd.
Ball Surface Hardness: The Shore D hardness measured at the surface of the resulting two-piece solid golf ball in accordance with ASTM D-2240.
Hardness Difference: The value obtained by subtracting the average Shore D hardness of the core from the Shore D hardness at the surface of the ball.

TABLE 3

|  |  | Example | | | Comparative Example | | | |
| --- | --- | --- | --- | --- | --- | --- | --- | --- |
|  |  | 1 | 2 | 3 | 1 | 2 | 3 | 4 |
| Type of cover | | R | R | R | R | U | I | R |
| Ball performance characteristics | | | | | | | | |
| Initial velocity (m/s) | | 77.1 | 77.4 | 77.4 | 77.5 | 77.2 | 76.8 | 77.4 |
| Flight perform-ance | Total distance (m) | 195.7 | 194.1 | 195.5 | 192.0 | 193.5 | 197.2 | 193.7 |
|  | Spin rate with W#1 (rpm) | 3,657 | 3,822 | 3,784 | 3,991 | 3,779 | 3,487 | 3,829 |
|  | Rating | good | good | good | poor | fair | good | fair |
| Spin perform-ance | Spin rate (rpm) | 6,620 | 6,753 | 6,813 | 7,035 | 6,664 | 6,238 | 6,976 |
|  | Rating | good | good | good | poor | good | good | poor |
| Scuff resistance | | good | good | good | good | fair | poor | good |

Type of Cover: rubber (R), urethane (U), or ionomer resin (I)
Initial Velocity: Results of initial velocity measurements based on USGA standards.
Total Distance: The distance traveled by a ball when hit at a head speed of 40 m/s using a driver (W#1) mounted on a swing machine. The club used was a TourStage V700 (made by Bridgestone Sports Co., Ltd.) having a loft angle of 11 degrees.
Flight Performance and Rating: The flight performance was rated as shown below. In addition, the spin rates measured in these flight tests are shown in Table 3.
Good: Total distance was at least 194 m
Fair: Total distance was 193 to 194 m
Poor: Total distance was less than 193 m
Spin Performance: The spin rate of the ball when hit at a head speed of 20 m/s using a sand wedge mounted on a swing machine was measured. The club used was J's Classical Edition (made by Bridgestone Sports Co., Ltd.). The spin was rated as follows.
Good: 6,000 to 6,950 rpm
Poor: more than 6,950 rpm
Scuff Resistance: The ball was temperature conditioned to 13° C. for 4 hours, then hit once at a head speed of 45 m/s with a pitching wedge having angular grooves on the clubface. The scuff resistance was rated as follows.
Good: Ball could be used again
Fair: Hard to judge either way
Poor: Ball could no longer be used In Comparative Example, syndiotactic 1,2-polybutadiene was not included in the rubber formulation for the cover. As a result, the ball had too low a surface hardness and thus took on too much spin on approach shots. Even when hit with a number one wood, the ball had too much spin, causing it to follow a high trajectory at the expense of distance.

In Comparative Example 2, the cover was made of a urethane material, which has a scuff resistance that is somewhat inferior to that of rubber materials. The resilience is also a little lower than that of rubber materials, resulting in a somewhat shorter distance.

In Comparative Example 3, the cover was made of an ionomer resin, and thus had a very low scuff resistance.

In Comparative Example 4, the cover formulation did not include syndiotactic 1,2-polybutadiene, but included high-styrene rubber. Because the ball had too low a surface hardness, it was overly receptive to spin on approach shots. Even when hit with a number one wood, the spin was slightly excessive, resulting in a total distance that was a little on the short side.

The solid golf balls of the invention have excellent scuff resistance and rebound characteristics. Moreover, the surface hardness of the ball can be adjusted as appropriate. These features make it possible for the ball to achieve the degree of spin desired in particular by professional golfers, skilled amateurs, and other players who aspire to a high level of proficiency.

What is claimed is:

1. A solid golf ball comprising a core and a cover layer, characterized in that the cover layer is formed by carrying out a crosslinking reaction on a rubber composition comprising, in admixture, 100 parts by weight of a base rubber which is composed mainly of a mixture of (A) a polybutadiene of at least 40% cis-1,4 structure with (B) a syndiotactic 1,2-polybutadiene, (C) at least 5 parts by weight of methacrylic acid, (D) at least 5 parts by weight of a metal oxide, and (E) at least 0.1 part by weight of a polymerization initiator, and wherein 100 parts by weight of the base rubber is composed of 50 to 95 parts by weight of component A, 5 to 40 parts by weight of component B, and (F) 0 to 20 parts by weight of a polyisoprene rubber of at least 40 wt % cis-1,4 structure; and the rubber composition includes 5 to 40 parts by weight of component C, 5 to 40 parts by weight of component D, and 0.1 to 5 parts by weight of component E per 100 parts by weight of the base rubber.

2. The solid golf ball of claim 1, characterized in that the ball surface and the core have a difference in Shore D hardness therebetween such that $-3 \leq [(\text{ball surface hardness}) - (\text{average core hardness})]$.

3. The solid golf ball of claim 1 which is a two-piece solid golf ball.

4. The solid golf ball of claim 1, characterized in that the cover layer has an overall thickness of at most 2.0 mm.

5. The solid golf ball of claim 1, characterized in that the ball has a USGA standard test-based initial velocity of 76.5 to 77.7 m/s.

6. The solid golf ball of claim 1, wherein the cis-1,4 structure content is at least 80 wt %.

7. The solid golf ball of claim 1, wherein the cis-1,4 structure content is at least 94 wt %.

8. The solid golf ball of claim 1, wherein 100 parts by weight of the base rubber is composed of 60 to 80 parts by weight of component A.

9. The solid golf ball of claim 1, wherein 100 parts by weight of the base rubber is composed of 8 to 30 parts by weight of component B.

10. The solid golf ball of claim 1, wherein the component (F) content is not more than 10 wt %.

11. The solid golf ball of claim 1, wherein the component (F) content is not more than 5 wt %.

12. The solid golf ball of claim 1, wherein the rubber composition includes 10 to 30 parts by weight of component C per 100 parts by weight of the base rubber.

13. The solid golf ball of claim 1, wherein the rubber composition includes 10 to 30 parts by weight of component D per 100 parts by weight of the base rubber.

14. The solid golf ball of claim 1, wherein the polymerization initiator is one of an organic peroxide and inorganic peroxide.

15. The solid golf ball of claim 1, wherein the rubber composition includes 0.8 to 1.4 parts by weight of component E per 100 parts by weight of the base rubber.

16. The solid golf ball of claim 1, wherein the cover layer further comprises at least one of an inert filler, antioxidants, dispersants, resin stabilizers, processing aids and vulcanization chemicals.

17. The solid golf ball of claim 1, wherein the cover layer has an overall thickness between 0.3 mm and 3.0 mm.

18. The solid golf ball of claim 1, wherein the cover layer has an overall thickness between 1.0 mm and 1.9 mm.

19. A solid golf ball comprising a core and a cover layer, characterized in that the cover layer is formed by carrying out a crosslinking reaction on a rubber composition comprising, in admixture, 100 parts by weight of a base rubber which is composed mainly of a mixture of (A) a polybutadiene of at least 80% cis-1,4 structure with (B) a syndiotactic 1,2-polybutadiene, (C) at least 5 parts by weight of methacrylic acid, (D) at least 5 parts by weight of a metal oxide, and (E) at least 0.1 part by weight of a polymerization initiator, and wherein 100 parts by weight of the base rubber is composed of 60 to 80 parts by weight of component A, 8 to 30 parts by weight of component B, and (F) 0 to 5 parts by weight of a polyisoprene rubber of at least 40 wt % cis-1,4 structure; and the rubber composition includes 10 to 30 parts by weight of component C, 10 to 30 parts by weight of component D, and 0.8 to 1.4 parts by weight of component E per 100 parts by weight of the base rubber, and wherein the cover layer has an overall thickness between 0.3 mm and 3.0 mm.

* * * * *